United States Patent [19]

Behringer

[11] Patent Number: 4,878,402

[45] Date of Patent: Nov. 7, 1989

[54] WATER RESISTANT CONTROL LINKAGE

[76] Inventor: John W. Behringer, 143 Main St., North Kingstown, R.I. 02852

[21] Appl. No.: 165,749

[22] Filed: Mar. 9, 1988

[51] Int. Cl.[4] .............................................. F16H 35/18

[52] U.S. Cl. ....................................... 74/10.8; 277/177

[58] Field of Search ...................... 74/10.8, 10 R, 553, 74/573, 574, 606 R; 277/177; 285/33, 331

[56] References Cited

U.S. PATENT DOCUMENTS

| | | | |
|---|---|---|---|
| 2,729,114 | 1/1956 | Young | 74/553 X |
| 2,738,758 | 3/1956 | Cutler et al. | 74/10 R |
| 2,971,143 | 2/1961 | Stilwell, Jr. | 74/553 X |
| 3,064,494 | 11/1962 | Brewster | 74/10 R |
| 3,443,816 | 5/1969 | Saleri et al. | 277/177 X |
| 3,727,879 | 4/1973 | Lange et al. | 277/177 X |
| 4,463,972 | 8/1984 | Weinhold | 285/331 X |

*Primary Examiner*—Peter A. Aschenbrenner
*Attorney, Agent, or Firm*—Jones, Day, Reavis & Pogue

[57] ABSTRACT

A fluid resistant control linkage assembly having a housing with interior and exterior sides. The control linkage has a circular groove defined in the exterior side of the housing. A ring is rotatably disposed with the groove. A handle is affixed to the ring and located outside the housing to input rotational motion to the ring. An opening is defined in the groove to provide access to the interior of the housing. An array of gear teeth or a yoke or a post is affixed to the ring at the opening.

The groove may be fitted with at least one elastromeric washer which is supported by at least one concentric shoulder along said groove.

20 Claims, 2 Drawing Sheets

WATER RESISTANT CONTROL LINKAGE

The present invention relates generally to a control linkage for a device which is substantially resistant to adverse environments.

BACKGROUND AND BRIEF SUMMARY OF THE INVENTION

The actuation and control of environmentally sensitive equipment, whether it be electronic or mechanical or the combination, has always been of great interest. There is great need for economical, secure and reliable control linkage for an environmentally sensitive device. For example, as shown in the preferred embodiment, if water or steam should enter the radio's inner workings, great harm may be caused. The novel and unique application of elastomeric washers between the control linkage handles prevents external elements from entering the device yet allowing ample versatility in control. The novel and unique application of elastomeric washers are supported and retained in place by shoulders formed in grooves on the device.

Numerous other advantages and features of the invention will become readily apparent from the following detailed description of the preferred embodiment of the invention, from the claims and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE INVENTION

Figures 1, 2:
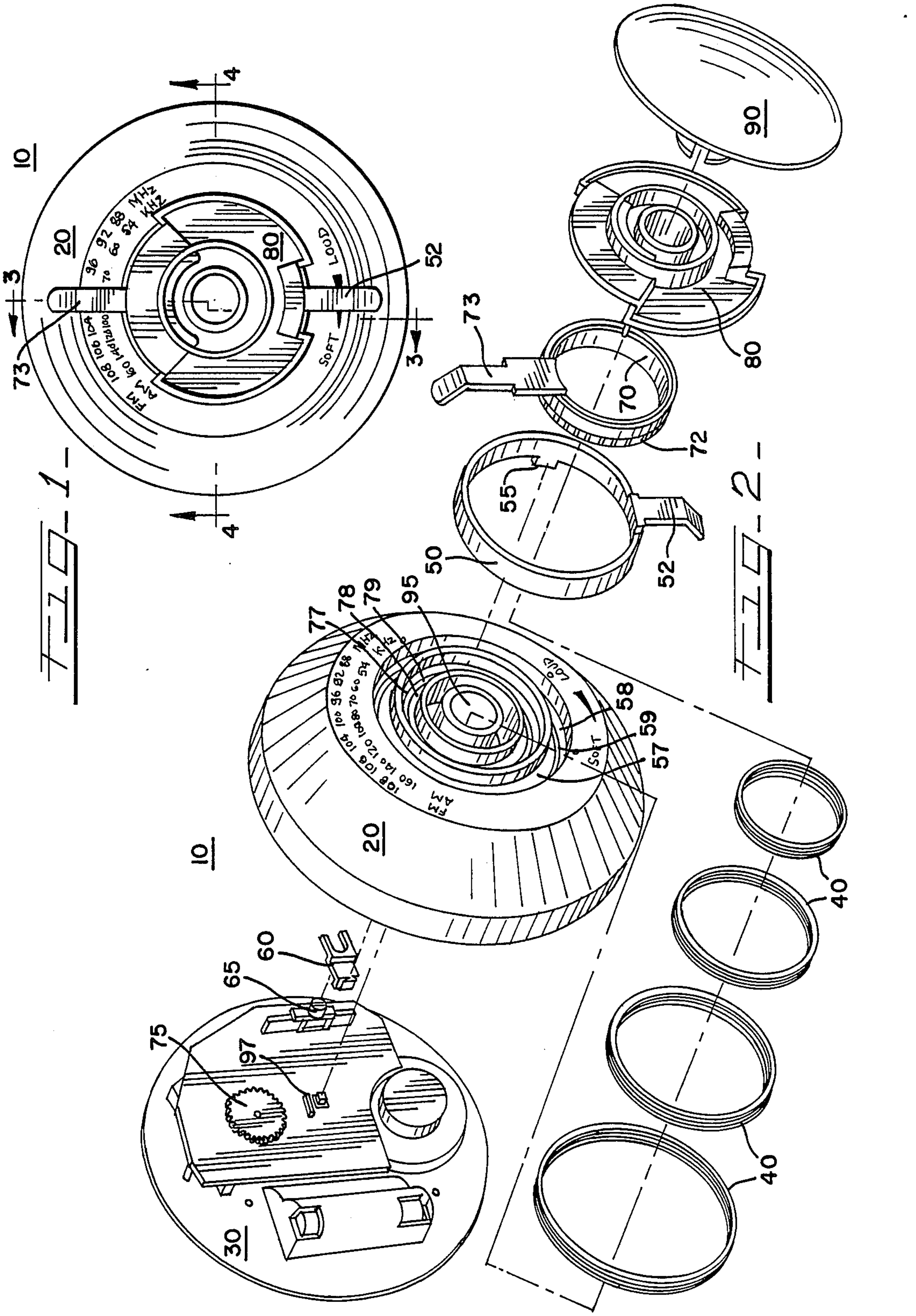
FIG. 1 is a front elevation of the water resistant control linkage of the present invention embodied in a sound emitting device.
FIG. 2 is an exploded perspective view of the water resistant control linkage of the present invention as shown in FIG. 1.

While the invention is susceptible of embodiment in many different forms, there is shown in the drawings and will herein be described in detail a preferred embodiment of the invention. It should be understood, however, that the present disclosure is to be considered as an exemplification of the principles of the invention and is not intended to limit the spirit and scope of the invention and/or claims to the embodiment illustrated.

Referring now to FIG. 1, the numeral 10 indicated generally the water resistant control linkage of the present invention embodied in an associated sound emitting device such as a radio. A grooved face 20 is shown with guide handle 52 and toothed guide handle 73 positioned upon face 20 with guide retainer plate 80 overlying the face.

FIG. 2 is an exploded perspective view of the present invention 10 depicting base 30 with gear 75 and linear slide control 65 positioned thereon. Gear 75 is fashioned to control a conventional rotary potentiometer or other device (not shown). Yoke 60 is fashioned to be complementary with slide control 65. Slide control 65 may be a potentiometer or other conventional device. Grooved face 20 is shown with guide groove 59 in which inner and outer guide shoulders 57 & 58 respectively are fashioned therein. Guide groove 79 is shown on grooved face 20 with inner and outer guide shoulders 77, 78 fashioned therein. Elastic washers 40 of varying diameters are shown sized and postioned to fit into corresponding grooves 59 and 79 and are supported and retained by inner and outer shoulders 57, 78, 58, 77 respective. Linkage ring 50 is shown with guide handle 52 affixed thereto and guide yoke adapter 55 protruding therefrom. Guide yoke adapter 55 is dimensioned to connect with yoke 60. Linkage ring 70 is shown with toothed guide handle 73 affixed thereto in which teeth 72 are configured therein. Teeth 72 are fashioned to complement the teeth of gear 75. Guide retainer plate 80 controls the travel of retainer ring 50 by restricting the movement of handle 52 between stops at each of its ends. Likewise handle 73 is restricted between stops at each of its ends. Between retainer plate 80 and cover plate 90 is a tension spring 92 and elastic washer (not shown) in order to seal opening 95 in face 20. Cover plate 90 protrudes through opening 95 to engage a conventional push button switch 97 mounted on base 30.

Figure 3:
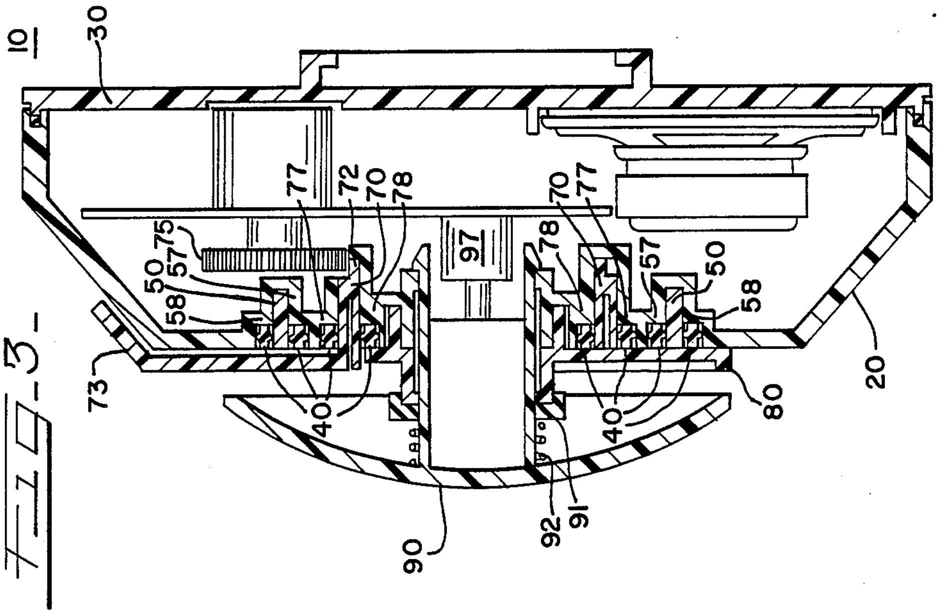
FIG. 3 is a view of the present invention taken along line 3—3 of FIG. 1.

FIG. 3 is a cross-sectional view along line 3—3 of FIG. 1 in which cover plate 90 of the present invention 10 is positioned onto guide retainer plate 80 and tensioned by spring 92 and washer 19 to engage push button switch 97. Toothed guide handle 73 is shown affixed to linkage ring 70 in which teeth 72 are fashioned therein to complementary engage gear 75. Elastic washers 40 are shown in frictional proximity to linkage ring 70 and supported along shoulders 77, 78. Linkage ring 50 is shown in frictional proximity to elastomeric washers 40 in which washers 40 are supported by guide shoulders 57, 58. Base 30 is shown in complementary engagement of grooved face 20.

Figure 4:
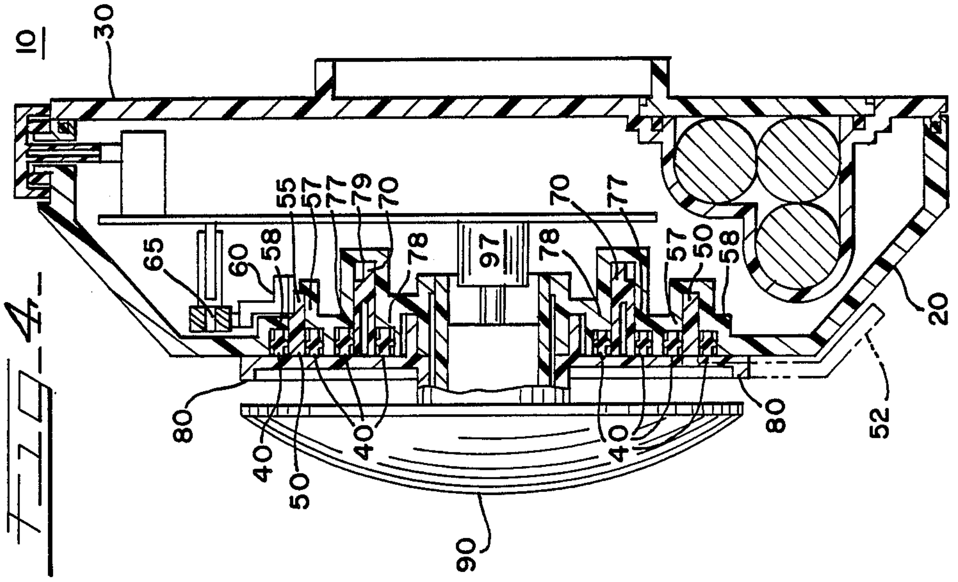
FIG. 4 is a view of the present invention taken along line 4—4 of FIG. 1.

FIG. 4 is a cross-sectional view of the present invention 10 along line 4—4 of FIG. 1. Cover plate 90 is shown affixed to guide retainer plate 80 in which linkage ring 50 is shown set into grooved face 20. Elastic washers 40 are positioned on shoulders 57, 58 as set in guide groove 59. Guide-yoke adapter 55 is affixed to linkage ring 50 in which adapter 55 is dimentioned to engage yoke 60 which is in moveable complimentary engagement to slide control 65. Linkage ring 70 is fashioned into guide groove 79 of face 20 in which elastomeric washers 40 are a frictional proximity to and supported by guide shoulders 77, 78. Guide handle 52 shown in outline, is retained and constrained for travel by guide retainer plate 80. Base 30 is in complementary engagement to grooved face 20.

The operation and use of the present invention 10 is effectively and simply described as follows. In the preferred embodiment shown, for a radio which may be used out of doors, in bath or shower or other wet applications, the water control resistant linkage is used to control either volume or tuned frequency adjustment. Handle 52 being affixed to circular linkage ring 50 which is positioned in guide groove 59 is substantially hermetically sealed from water and resistant to particulate matter by the use of elastomeric washers 40. The washers 40 of varying appropriate sizes are supported by shoulders 57, 58 (as shown in FIGS. 2-4) in which guide-yoke adapter 55 is affixed to engage yoke 60 and is complementary positioned to moveably engage slide control 65 in order to vary a potentiometer to other device.

Linkage ring 70 is shown with teeth 72 protruding along its outer circular circumference in which operation of toothed guide handle 73 causes linkage ring 70 to rotate, and in turn, teeth 72 engage gear 75 to likewise vary a conventional frequency tuning device. Linkage ring 70 is positioned within guide groove 79 and is in frictional proximity with washers 40 to create a hermetic seal which is also resistant to particulate matter. Washers 40 are supported by guide shoulders 77, 78 fashioned within guide groove 79. The use of shoulders 57, 58 in groove 59 and shoulders 77, 78 in groove 79, to support the varying diameter elastic washers 40 in frictional proximity to linkage rings 50 and 70 and grooves 59 and 79, respectively, allows for the inventive water and particulate matter resistant nature of the present invention 10.

Guide retainer plate 80 is superimposed concentrically upon linkage rings 50 and 70 as placed into grooves 59 and 79 in order to retain linkage rings 50 and 70 therein retainer plate 80 also maintains elastic washers 40 in frictional proximity to linkage rings 50 and 70 in order to abutt shoulders 57, 58 and 77, 78 respectively. Guide retainer plate 80 also controls the semi-arcuate travel of the tuning and frequency adjustment handles 52 and 73 respectively. Cover plate 90 is affixed over and is retained by guide retainer plate 80 and grooved face 20 and is tensioned away from guide retainer plate 80 by spring 97 in which the cover plate 90 protrudes into opening 95 so that when cover plate 90 and spring 97 is compressed into grooved face 20, push button switch 97 or other convention device is activated.

It is understood that the present invention is not to be limited to the embodiment shown but may use with more or less number of concentric guides based upon the principal of obtaining fluid and particulate matter resistance for a control linkage by the use of grooves with inner and outer internal shoulders in order to support elastic washers or other sealing means. It is further understood that not only may toothed gears and slidable knobs with moveable yokes be used, but also other conventional physical connections be applicable. It is further contemplated that the inventive features shown and described in the preferred embodiment may also be obtained by the use of a single concentric shoulder within one of said grooves as an individual sealing means or that the material from which the housing is formed be sufficiently resilient to provide the sealing function without the need for separate sealing rings.

While the foregoing has presented certain specific embodiments of the present invention, it is to be understood that these embodiments have been presented by way of example only. It is expected that others will perceive differences which, while bearing from the foregoing, do not depart from the spirit and scope of the invention herein described and claimed.

What is claimed:

1. A fluid and particulate matter resistant control linkage assembly for controlling an associated device comprising:
   - a ring;
   - a handle affixed to said ring;
   - a circular groove defined in a housing with said ring rotatably disposed within said groove;
   - means disposed within said groove to seal out fluids or particulate matter from said groove;
   - a retainer fixed to retain said ring within said groove; and
   - means affixed to said ring to link said ring to the interior side of said housing.

2. A fluid and particulate matter resistant control linkage assembly associated with a housing having an interior side and an exterior side, said control linkage assembly comprising:
   - a circular groove defined in the exterior side of said housing;
   - a ring rotatably disposed within said groove;
   - a handle affixed to said ring and located outside said housing to impart rotational motion to said circular member;
   - means disposed within said groove to seal out fluid and particulate matter from said groove;
   - an opening defined in said groove to provide access to the interior of said housing; and
   - means affixed to said ring at said opening to link said ring to the interior side of said housing.

3. The invention of claim 1 wherein said ring is provided with an array of gear teeth associated with a control gear.

4. The invention of claim 2 wherein said ring is provided with an array of gear teeth associated with a control gear.

5. The invention of claim 1, wherein said ring is provided with a yoke fixed thereon associated with a slidable control knob disposed within said housing.

6. The invention of claim 2, wherein said ring is provided with a yoke fixed thereon associated with a slidable control knob disposed within said housing.

7. The invention of claim 1, wherein said ring is provided with a post fixed thereon associated with a movable yoke disposed within said housing.

8. The invention of claim 2, wherein said ring is provided with a post fixed thereon associated with a movable yoke disposed within said housing.

9. The invention of claim 1, further comprising means disposed within said groove to substantially hermetically seal the interior of said housing from the exterior of said housing.

10. The invention of claim 2, further comprising means disposed within said groove to substantially hermetically seal the interior of said housing from the exterior of said housing.

11. The invention of claim 9, wherein said sealing means comprises at least one elastic washer concentrically disposed in said groove.

12. The invention of claim 10, wherein said sealing means comprises at least one elastic washer disposed concentrically in said groove.

13. The invention of claim 9, wherein said groove is defined with at least one concentric shoulder to support said sealing means.

14. The invention of claim 10, wherein said groove is defined with at least one concentrical shoulder to support said sealing means.

15. The invention of claim 11, wherein said groove is defined with two concentric shoulders to support said washers.

16. The invention of claim 12, wherein said groove is defined with two concentric shoulders to support said washers.

17. A water resistant control linkage assembly for controlling an associated radio device, comprising:
   - a housing having an interior side and an exterior side;
   - a circular groove defined in the exterior side of said housing;
   - a ring rotatably disposed within said groove;

a handle affixed to said ring and located outside said exterior side of said housing to impart rotational motion to said ring.

an opening defined in said groove to provide access to the interior of said housing;

linkage means affixed to said ring at said opening; and elastic washers disposed between said ring and said groove to seal out washer from entering said opening in said groove.

18. The invention of claim 17, wherein two concentric shoulders are defined within said circular groove to support said washers.

19. The invention of claim 17, wherein said linkage means comprises a yoke affixed to said ring associated with a slidable knob.

20. The invention of claim 17, wherein said linkage means comprises an array of gear teeth in said ring associated with a control gear.

* * * * *